United States Patent
Bolden

(10) Patent No.: US 10,137,920 B1
(45) Date of Patent: Nov. 27, 2018

(54) HAND TRUCK ASSEMBLY

(71) Applicant: Juel Bolden, Apopka, FL (US)

(72) Inventor: Juel Bolden, Apopka, FL (US)

( * ) Notice: Subject to any disclaimer, the term of this patent is extended or adjusted under 35 U.S.C. 154(b) by 0 days.

(21) Appl. No.: 15/602,276

(22) Filed: May 23, 2017

(51) Int. Cl.
| | | |
|---|---|---|
| *B62D 5/02* | (2006.01) | |
| *B62B 5/02* | (2006.01) | |
| *B62B 1/14* | (2006.01) | |
| *B62B 5/06* | (2006.01) | |
| *B62B 1/00* | (2006.01) | |

(52) U.S. Cl.
CPC .............. *B62B 5/02* (2013.01); *B62B 1/008* (2013.01); *B62B 1/14* (2013.01); *B62B 5/06* (2013.01)

(58) Field of Classification Search
CPC .. B62B 1/008; B62B 1/02; B62B 1/08; B62B 1/10; B62B 5/02; B62B 5/06; B62B 5/026; B62B 5/028; B62B 5/025
See application file for complete search history.

(56) References Cited

U.S. PATENT DOCUMENTS

| | | | | |
|---|---|---|---|---|
| 2,243,915 A | | 6/1941 | Mueller | |
| 2,339,646 A | * | 1/1944 | Mann | B62B 5/06 16/422 |
| 2,360,799 A | * | 10/1944 | Slingsby | B62B 3/04 126/298 |
| 2,534,868 A | * | 12/1950 | Johnston | B62B 3/04 414/491 |
| 2,980,200 A | * | 4/1961 | Kibby | B62B 1/12 182/129 |
| 3,112,042 A | * | 11/1963 | Leshner | B62B 1/145 280/47.2 |
| 3,411,798 A | | 11/1968 | Capadalis | |
| 3,893,687 A | * | 7/1975 | Victor | B62B 1/12 280/47.27 |
| 4,045,842 A | * | 9/1977 | Theriault | B62B 5/06 16/422 |
| 4,312,417 A | | 1/1982 | Dalton et al. | |
| 4,368,896 A | * | 1/1983 | Ortega | B62B 5/02 280/47.2 |
| 4,441,849 A | * | 4/1984 | Dizmang | B66C 23/205 254/325 |
| 4,630,837 A | | 12/1986 | Kazmark | |
| 4,681,330 A | | 7/1987 | Misawa | |
| 4,794,667 A | * | 1/1989 | Nelson | B25G 1/00 16/426 |
| 4,846,486 A | * | 7/1989 | Hobson | A47C 4/52 280/47.25 |
| 4,974,871 A | | 12/1990 | Mao | |
| 5,149,116 A | * | 9/1992 | Donze | B62B 1/20 280/47.26 |

(Continued)

FOREIGN PATENT DOCUMENTS

WO  WO2007059617  5/2007

*Primary Examiner* — James A Shriver, II
*Assistant Examiner* — Steve Clemmons

(57) ABSTRACT

A hand truck assembly for transporting an object includes a frame that is selectively manipulated. A plate is coupled to the frame to support an object thereby facilitating the object to be lifted. A pair of first wheels is each rotatably coupled to the frame. Each of the first wheels rolls along the support surface thereby facilitating the object to be transported. A second wheel is rotatably coupled to the frame and the second wheel selectively supports the frame when one of the first wheels is damaged. A pair of handles is each coupled to the frame for gripping.

10 Claims, 4 Drawing Sheets

(56) References Cited

U.S. PATENT DOCUMENTS

| | | | |
|---|---|---|---|
| D344,833 S | | 3/1994 | Apter et al. |
| 5,468,010 A | * | 11/1995 | Johnson .................. B62B 1/12 |
| | | | 280/47.27 |
| 5,630,601 A | * | 5/1997 | vom Braucke ........... B62B 1/12 |
| | | | 280/40 |
| 5,873,147 A | * | 2/1999 | Hintz ....................... B62B 5/06 |
| | | | 16/426 |
| 6,139,029 A | * | 10/2000 | Shaw ...................... B62B 1/206 |
| | | | 280/47.371 |
| 6,880,203 B1 | * | 4/2005 | Aubin ................ B60B 33/0028 |
| | | | 16/31 R |
| 6,942,228 B2 | * | 9/2005 | Bunce ................. A01M 31/006 |
| | | | 280/1.5 |
| 7,014,203 B2 | * | 3/2006 | Liu ......................... B62B 7/083 |
| | | | 280/293 |
| 7,137,464 B2 | * | 11/2006 | Stahler, Sr. ............. B62B 5/023 |
| | | | 180/8.2 |
| 7,886,853 B2 | * | 2/2011 | Konopa ..................... B62B 1/26 |
| | | | 180/19.1 |
| D730,251 S | * | 5/2015 | Rindner ....................... D12/120 |
| D749,812 S | * | 2/2016 | Gibson .......................... D34/26 |
| 9,470,305 B2 | * | 10/2016 | Kaskawitz ........... F16H 59/0278 |
| 9,616,907 B1 | * | 4/2017 | Gibson ....................... B62B 1/12 |
| 9,845,100 B2 | * | 12/2017 | Kukulies ................... B62B 1/10 |
| 2005/0211011 A1 | * | 9/2005 | Victor ......................... A61G 5/10 |
| | | | 74/551.1 |
| 2005/0280220 A1 | | 12/2005 | Shen |
| 2009/0266833 A1 | * | 10/2009 | Savage ................ A45C 13/385 |
| | | | 220/757 |
| 2012/0153710 A1 | * | 6/2012 | Ryan ........................ B62B 1/12 |
| | | | 301/111.01 |

* cited by examiner

HAND TRUCK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to truck devices and more particularly pertains to a new truck device for transporting an object.

BRIEF SUMMARY OF THE INVENTION

An embodiment of the disclosure meets the needs presented above by generally comprising a frame that is selectively manipulated. A plate is coupled to the frame to support an object thereby facilitating the object to be lifted. A pair of first wheels is each rotatably coupled to the frame. Each of the first wheels rolls along the support surface thereby facilitating the object to be transported. A second wheel is rotatably coupled to the frame and the second wheel selectively supports the frame when one of the first wheels is damaged. A pair of handles is each coupled to the frame for gripping.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
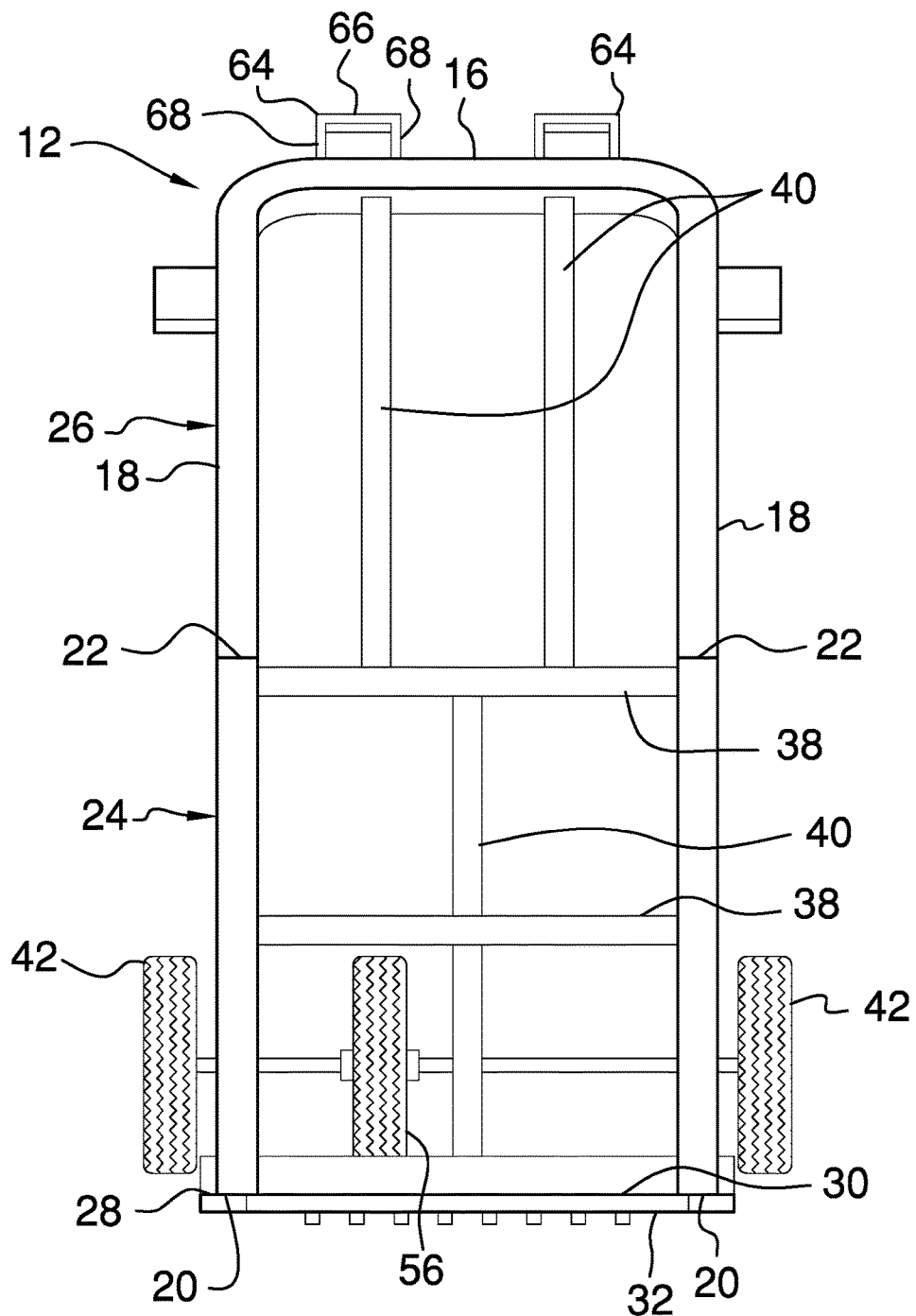
FIG. 1 is a front view of a hand truck assembly according to an embodiment of the disclosure.
Figure 2:
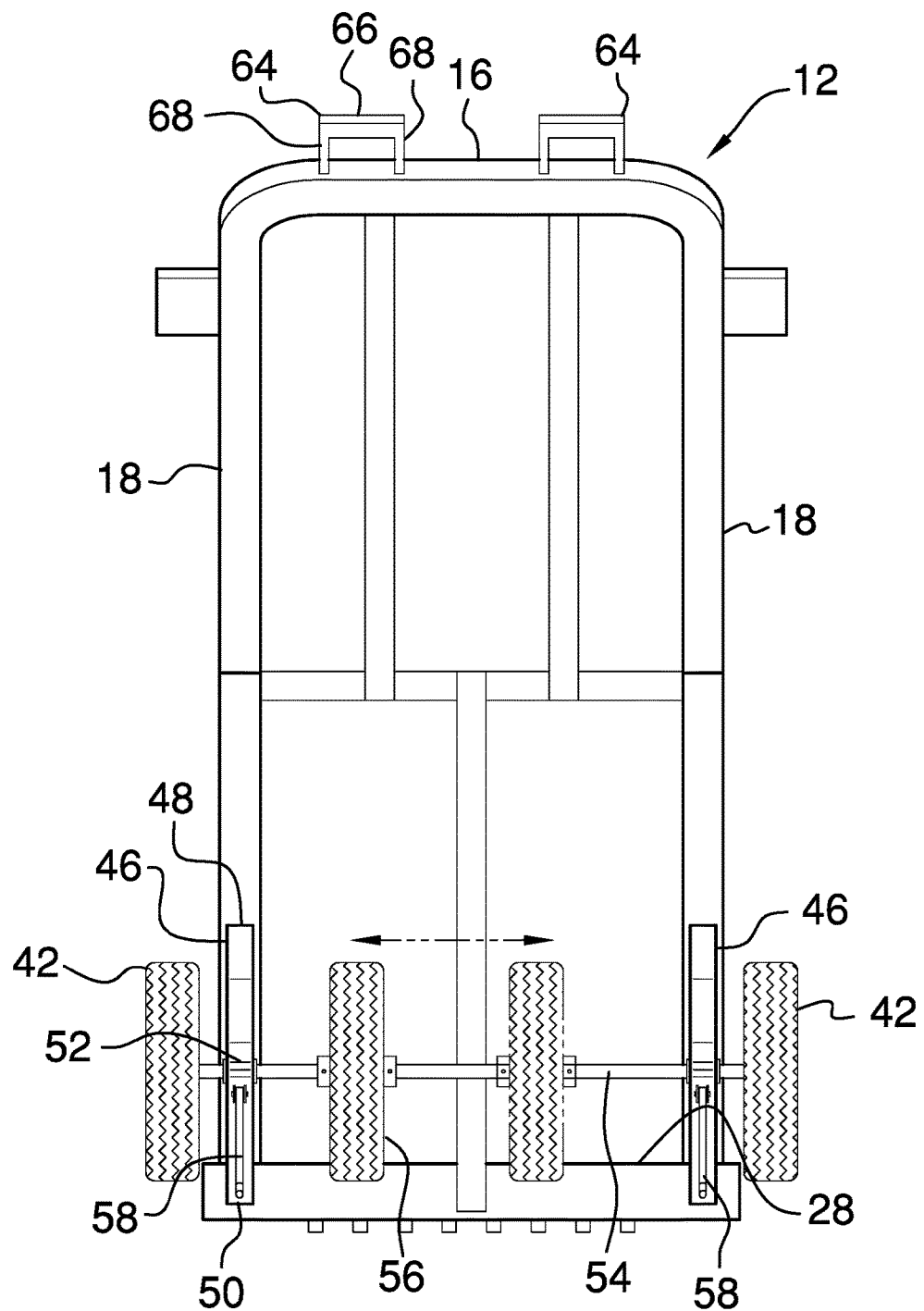
FIG. 2 is a back view of an embodiment of the disclosure.
Figure 3:
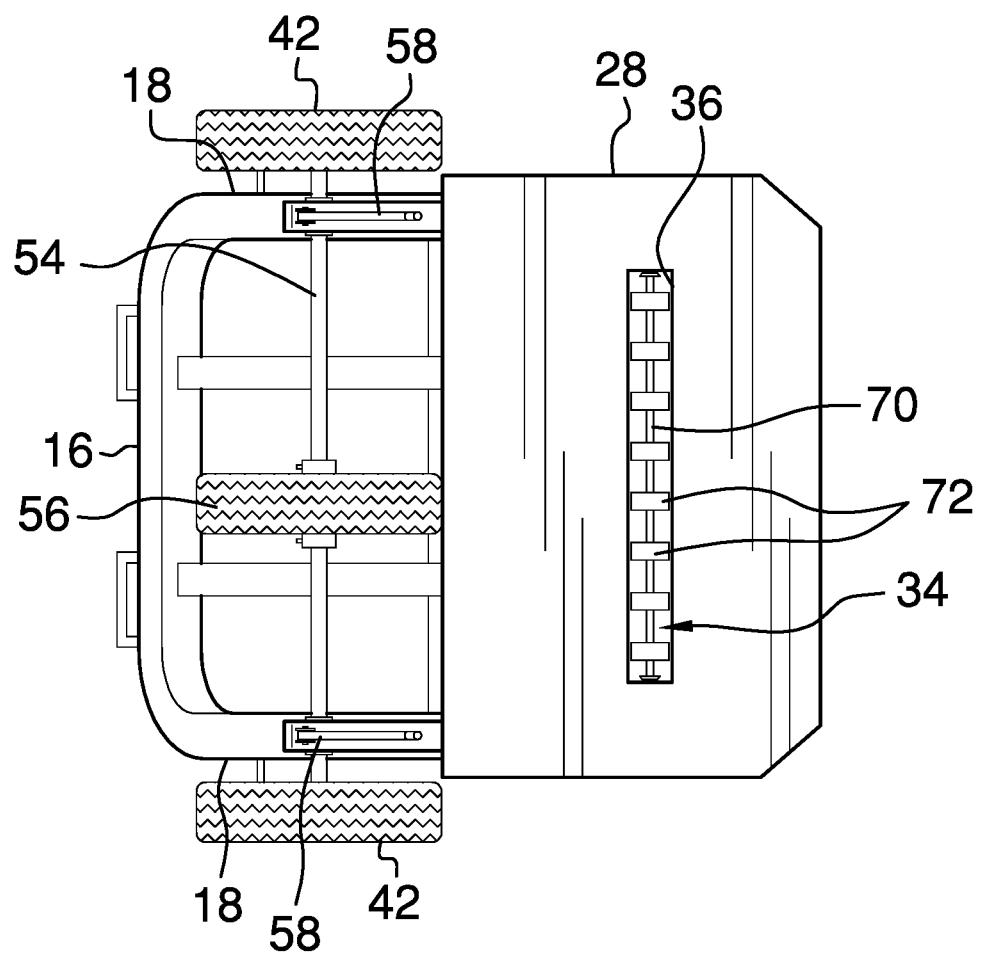
FIG. 3 is a bottom view of an embodiment of the disclosure.
Figure 4:
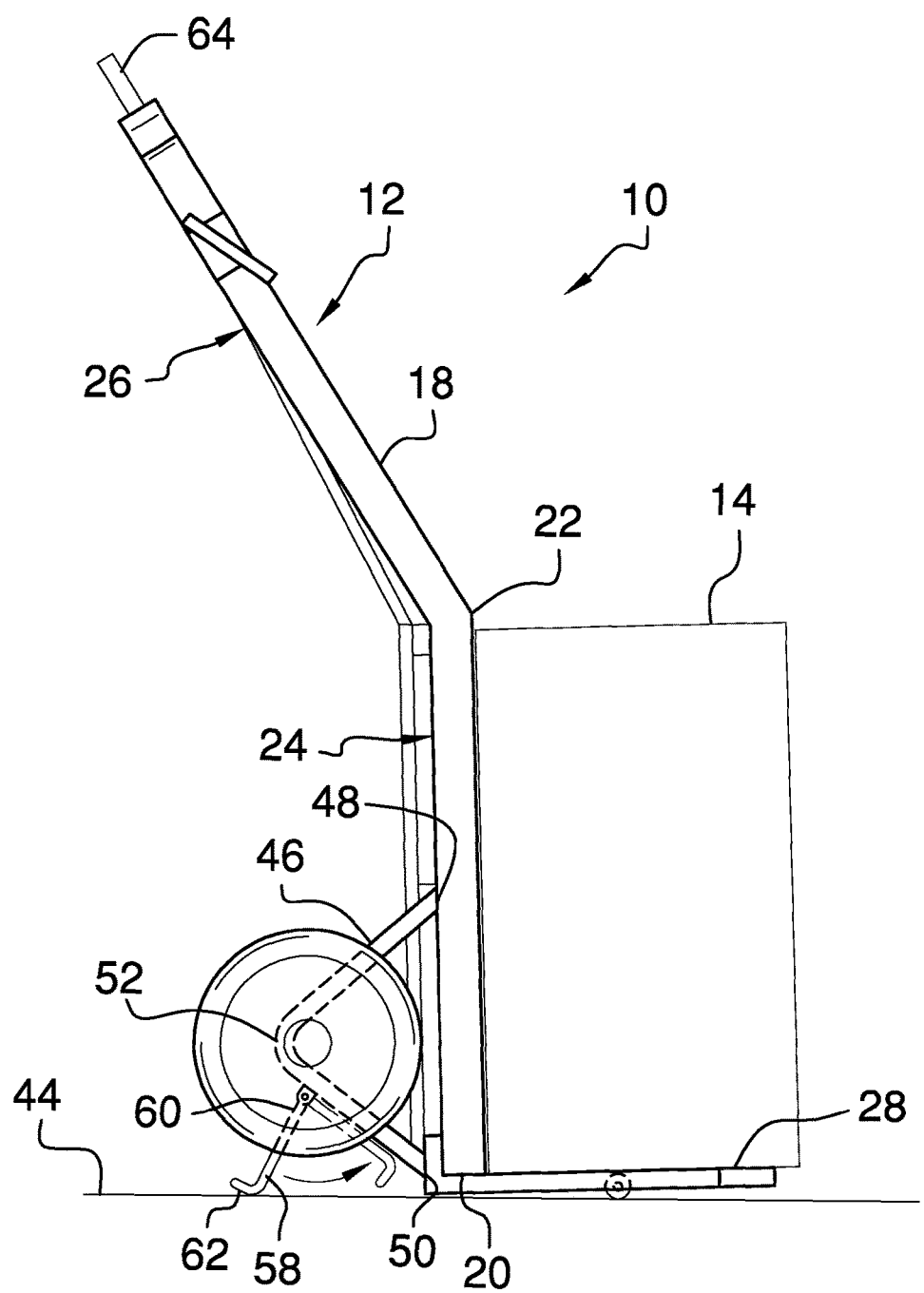
FIG. 4 is a right side view of an embodiment of the disclosure.

With reference now to the drawings, and in particular to FIGS. 1 through 4 thereof, a new truck device embodying the principles and concepts of an embodiment of the disclosure and generally designated by the reference numeral 10 will be described.

As best illustrated in FIGS. 1 through 4, the hand truck assembly 10 generally comprises a frame 12 that may be manipulated to carry an object 14. The frame 12 has a central member 16 extending between a pair of outward members 18 such that the frame 12 has a U-shape. Each of the outward members 18 has a distal end 20 with respect to the central member 16. Moreover, each of the outward members 18 has a first bend 22 thereon to define a lower half 24 forming an angle with an upper half 26. The first bend 22 corresponding to each of the outward members 18 is centrally positioned between the central member 16 and the distal end 20.

A plate 28 is coupled to the frame 12 to support the object 14 thereby facilitating the object 14 to be carried. The object 14 may be an object that is too heavy for a person to carry such as an appliance, a crate of bottles or any other similar object 14. The plate 28 has a first surface 30 and a second surface 32, and the first surface 30 is coupled to the distal end 20 corresponding to each of the outward members 18. The first surface 30 of the plate 28 is oriented perpendicular to the outward members 18. The plate 28 extends forwardly from the lower half 24 of the frame 12 having the upper half 26 of the frame 12 angling rearwardly with respect to the plate 28. The plate 28 has a slot 34 extending through the first 30 and second 32 surfaces and the slot 34 is centrally positioned on the plate 28. The slot 34 extends substantially between the outward members 18 and the slot 34 has a bounding edge 36.

A plurality of first supports 38 is provided and each of the first supports 38 is coupled between the outward members 18. Each of the first supports 38 is horizontally oriented such that the plurality of first supports 38 retains the outward members 18 being spaced apart from each other. A plurality of second supports 40 is provided and each of the second supports 40 is coupled between the central member 16 and the plate 28.

A pair of first wheels 42 is provided and each of the first wheels 42 is rotatably coupled to the frame 12. Each of the first wheels 42 rolls along a support surface 44 thereby facilitating the object 14 to be transported. The support surface 44 may be ground, a floor or other horizontal support surface 44. Additionally, each of the first wheels 42 may be inflatable rubber wheels or the like.

A pair of mounts 46 is provided and each of the mounts 46 has a first end 48, a second end 50 and a second bend 52 that is centrally positioned between the first 48 and second 50 ends. Each of the first 48 and second 50 ends corresponding to each of the mounts 46 is coupled to an associated one of the outward members 18 and each of the mounts 46 extends rearwardly from the associated outward member 18. Each of the mounts 46 is positioned on the lower half 24 of the associated outward member 18. Moreover, each of the first wheels 42 is positioned on the second bend 52 of an associated one of the mounts 46.

An axle 54 extends between the second bend 52 on each of the mounts 46. A second wheel 56 is rotatably positioned on the axle 54 to roll along the support surface 44. The second wheel 56 is slidable between the pair of first wheels 42 such that the second wheel 56 selectively supports the frame 12 when one of the first wheels 42 is damaged. In this way the frame 12 may be manipulated to transport the object 14 without being compromised by the damaged first wheel 42. The second wheel 56 may comprise an inflatable rubber wheel or the like.

A pair of kickstands 58 is provided and each of the kickstands 58 is pivotally coupled to an associated one of the mounts 46. Each of the kickstands 58 retains the frame 12 in a vertical orientation on the support surface 44 when the kickstands 58 are deployed. Each of the kickstands 58 comprises a leg 60 and a foot 62. The leg 60 corresponding to each of the kickstands 58 is movably coupled to the associated mount. Moreover, the foot 62 corresponding to each of the kickstands 58 abuts the support surface 44 when each of the kickstands 58 is selectively deployed.

A pair of handles 64 is provided and each of the handles 64 is coupled to the frame 12. Each of the handles 64 has a middle member 66 extending between a pair of end members 68. Moreover, each of the end members 68 corresponding to each of the handles 64 is coupled to the central member 16 of the frame 12. The middle member 66 of the corresponding handle is spaced from the central member 16 for gripping.

A shaft 70 is coupled to the bounding edge 36 of the slot 34 such that the shaft 70 extends across the slot 34. A plurality of rollers 72 is provided and each of the rollers 72 is rotatably positioned around the shaft 70. Each of the rollers 72 rolls along the support surface 44 and each of the rollers 72 may comprise rubber wheels or the like. The rollers 72 are spaced apart from each other and are distributed along the shaft 70. Each of the rollers 72 extends beyond the second surface 32 of the plate 28 and each of the rollers 72 is spaced below the first surface 30 of the plate 72.

In use, the object 14 is positioned on the plate 28 to facilitate the object 14 to be transported. Each of the handles 64 is gripped to tilt onto each of the first wheels 42 and the second wheel 56 thereby lifting the plate 28 upwardly from the support surface 44. The frame 12 is urged to roll along the support surface 44 thereby carrying the object 14 on the plate 28. Each of the rollers 72 selectively engages a curb, or other elevated object 14 on the support surface 44, thereby facilitating the plate 28 and the frame 12 to be rolled over the curb. In this way the rollers 72 enhance transporting the object 14 over the curb. The kickstands 58 are selectively deployed to retain the frame 12 in an upright position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hand truck assembly being configured to transport an object over a curb or the like, said assembly comprising:
   a frame being configured to be manipulated, said frame having a central member extending between a pair of outward members such that said frame has a U-shape, each of said outward members having a distal end with respect to said central member, each of said outward members having a first bend thereon to define a lower half forming an angle with an upper half, said first bend corresponding to each of said outward members being centrally positioned between said central member and said distal end;
   a plate being coupled to said frame wherein said plate is configured to support an object thereby facilitating the object to be lifted;
   a pair of first wheels, each of said first wheels being rotatably coupled to said frame wherein each of said first wheels is configured to roll along the support surface thereby facilitating the object to be transported;
   a second wheel being rotatably coupled to said frame such that said second wheel selectively supports said frame when one of said first wheels is damaged;
   a pair of handles, each of said handles being coupled to said frame wherein each of said handles is configured to be manipulated;
   a pair of mounts, each of said mounts having a first end, a second end and a second bend being centrally positioned between said first and second ends, each of said first and second ends corresponding to each of said mounts being coupled to an associated one of said outward members having each of said mounts extending rearwardly from said associated outward member, each of said mounts being positioned on said lower half of said associated outward member, each of said first wheels being positioned on said second bend of an associated one of said mounts; and
   an axle extending between said second bend on each of said mounts, said second wheel is rotatably positioned on said axle wherein said second wheel is configured to roll along the supports surface, said second wheel being slidable between said pair of first wheels.

2. The assembly according to claim 1, wherein said plate has a first surface and a second surface, said first surface being coupled to said distal end corresponding to each of said outward members having said first surface being oriented perpendicular to said outward members, said plate extending forwardly from said lower half of said frame having said upper half of said frame angling rearwardly with respect to said plate, said first surface being configured to have the object positioned thereon.

3. The assembly according to claim 2, wherein said plate has a slot extending through said first and second surfaces, said slot being centrally positioned on said plate, said slot being extending substantially between said outward members, said slot having a bounding edge.

4. The assembly according to claim 3, further comprising a shaft being coupled to said bounding edge of said slot such that said shaft extends across said slot.

5. The assembly according to claim 4, further comprising a plurality of rollers, each of said rollers being rotatably positioned around said shaft wherein each of said rollers is configured to roll along the support surface.

6. The assembly according to claim 2, further comprising a plurality of second supports, each of said second supports being coupled between said central member and said plate.

7. The assembly according to claim 1, further comprising a plurality of first supports, each of said first supports being coupled between said outward members, each of said first supports being horizontally oriented such that said plurality of first supports retains said outward members being spaced apart from each other.

8. The assembly according to claim 1, further comprising a pair of kickstands, each of said kickstands being pivotally coupled to an associated one of said mounts, wherein each of said kickstands is configured to retain said frame in a vertical orientation on the support surface, each of said kickstands comprising a leg and a foot, said leg corresponding to each of said kickstands being movably coupled to said associated mount, said foot corresponding to each of said kickstands being configured to abut the support surface when each of said kickstands is selectively deployed.

9. The assembly according to claim 1, wherein each of said handles has a middle member extending between a pair of end members, each of said end members corresponding to each of said handles being coupled to said central member of said frame having said middle member of said corresponding handle being spaced from said central member wherein said middle member of said corresponding handle is configured to be gripped.

10. A hand truck assembly being configured to transport an object over a curb or the like, said assembly comprising:
a frame being configured to be manipulated, said frame having a central member extending between a pair of outward members such that said frame has a U-shape, each of said outward members having a distal end with respect to said central member, each of said outward members having a first bend thereon to define a lower half forming an angle with an upper half, said first bend corresponding to each of said outward members being centrally positioned between said central member and said distal end;
a plate being coupled to said frame wherein said plate is configured to support an object thereby facilitating the object to be lifted, said plate having a first surface and a second surface, said first surface being coupled to said distal end corresponding to each of said outward members having said first surface being oriented perpendicular to said outward members, said plate extending forwardly from said lower half of said frame having said upper half of said frame angling rearwardly with respect to said plate, said first surface being configured to have the object positioned thereon, said plate having a slot extending through said first and second surfaces, said slot being centrally positioned on said plate, said slot extending substantially between said outward members, said slot having a bounding edge;
a plurality of first supports, each of said first supports being coupled between said outward members, each of said first supports being horizontally oriented such that said plurality of first supports retains said outward members being spaced apart from each other;
a plurality of second supports, each of said second supports being coupled between said central member and said plate;
a pair of first wheels, each of said first wheels being rotatably coupled to said frame wherein each of said first wheels is configured to roll along the support surface thereby facilitating the object to be transported;
a pair of mounts, each of said mounts having a first end, a second end and a second bend being centrally positioned between said first and second ends, each of said first and second ends corresponding to each of said mounts being coupled to an associated one of said outward members having each of said mounts extending rearwardly from said associated outward member, each of said mounts being positioned on said lower half of said associated outward member, each of said first wheels being positioned on said second bend of an associated one of said mounts;
an axle extending between said second bend on each of said mounts;
a second wheel being rotatably positioned on said axle wherein said second wheel is configured to roll along the supports surface, said second wheel being slidable between said pair of first wheels such that said second wheel selectively supports said frame when one of said first wheels is damaged;
a pair of kickstands, each of said kickstands being pivotally coupled to an associated one of said mounts, wherein each of said kickstands is configured to retain said frame in a vertical orientation on the support surface, each of said kickstands comprising a leg and a foot, said leg corresponding to each of said kickstands being movably coupled to said associated mount, said foot corresponding to each of said kickstands being configured to abut the support surface when each of said kickstands is selectively deployed;
a pair of handles, each of said handles being coupled to said frame wherein each of said handles is configured to be manipulated, each of said handles having a middle member extending between a pair of end members, each of said end members corresponding to each of said handles being coupled to said central member of said frame having said middle member of said corresponding handle being spaced from said central member wherein said middle member of said corresponding handle is configured to be gripped;
a shaft being coupled to said bounding edge of said slot such that said shaft extends across said slot; and
a plurality of rollers, each of said rollers being rotatably positioned around said shaft wherein each of said rollers is configured to roll along the support surface.

* * * * *